United States Patent
Raedy et al.

(10) Patent No.: US 9,631,950 B2
(45) Date of Patent: Apr. 25, 2017

(54) METHOD AND APPARATUS FOR ALIGNING A VEHICLE WITH AN INDUCTIVE CHARGING SYSTEM

(71) Applicant: Evatran Group, Inc., Wytheville, VA (US)

(72) Inventors: Steven Raedy, Raleigh, NC (US); Thomas Gattan Stout, II, Morrisville, NC (US); James Brian Normann, Holly Springs, NC (US); Christopher Ryan Yahnker, Raleigh, NC (US)

(73) Assignee: Evatran Group, Inc., Richmond, VA (US)

( * ) Notice: Subject to any disclaimer, the term of this patent is extended or adjusted under 35 U.S.C. 154(b) by 33 days.

(21) Appl. No.: 14/492,405

(22) Filed: Sep. 22, 2014

(65) Prior Publication Data

US 2015/0137801 A1    May 21, 2015

Related U.S. Application Data

(63) Continuation-in-part of application No. 13/198,863, filed on Aug. 5, 2011, now abandoned.

(51) Int. Cl.
*G01D 5/20* (2006.01)
*B60L 11/18* (2006.01)
(Continued)

(52) U.S. Cl.
CPC .............. *G01D 5/20* (2013.01); *B60L 11/182* (2013.01); *B60L 11/1824* (2013.01); *B60L 11/1833* (2013.01); *H02J 5/005* (2013.01); *H02J 7/025* (2013.01); *B60L 2230/16* (2013.01); *B60L 2240/527* (2013.01); *B60L 2270/147* (2013.01); *Y02T 10/7005* (2013.01);
(Continued)

(58) Field of Classification Search
CPC  B60L 11/1833; B60L 11/182; B60L 11/1824; B60L 2230/16; B60L 2240/527; B60L 2270/147; H02J 7/025; H02J 5/005; Y02T 10/7005; Y02T 90/12; Y02T 90/121; Y02T 90/125; Y02T 90/14; Y02T 10/7072
USPC .................. 324/207.17, 207.24, 207.26, 329
See application file for complete search history.

(56) References Cited

U.S. PATENT DOCUMENTS 5,498,948 A    3/1996  Bruni et al.
5,617,003 A    4/1997  Odachi et al.
(Continued)

*Primary Examiner* — Jay Patidar
(74) *Attorney, Agent, or Firm* — McDermott Will & Emery LLP

(57) ABSTRACT

A method and apparatus for aligning a vehicle with an inductive charging system is characterized by the addition of alignment coils to a secondary coil on the vehicle. For efficient inductive charging, it is necessary that the vehicle mounted secondary coil be aligned with a stationary primary coil of a transformer of the inductive charging system. When the primary coil is energized, it produces a magnetic field which induces a voltage in the alignment coils as a function of the proximity of the alignment coils to the central axis of the primary coil. The voltage differential between opposed pairs of alignment coils is determined by a comparator which then generates a directional signal which can be used by the operator of the vehicle to position the vehicle for closer alignment of the vehicle secondary coil with the primary coil and more efficient charging.

7 Claims, 11 Drawing Sheets

(51) Int. Cl.
*H02J 7/02* (2016.01)
*H02J 5/00* (2016.01)

(52) U.S. Cl.
CPC .......... *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 6,525,510 B1 | 2/2003 | Ayano et al. |
| 7,622,891 B2 | 11/2009 | Cheng et al. |
| 2009/0096413 A1 | 4/2009 | Partovi et al. |
| 2009/0212637 A1 | 8/2009 | Baarman et al. |
| 2010/0117596 A1 | 5/2010 | Cook et al. |
| 2010/0181841 A1 | 7/2010 | Azancot et al. |
| 2010/0259217 A1 | 10/2010 | Baarman et al. |
| 2011/0093048 A1 | 4/2011 | Aghassian |
| 2011/0175569 A1 | 7/2011 | Austin |
| 2011/0254377 A1 | 10/2011 | Wildmer et al. |
| 2011/0254503 A1 | 10/2011 | Widmer et al. |
| 2015/0094887 A1* | 4/2015 | Kawashima .......... B60L 11/182 701/22 |

\* cited by examiner

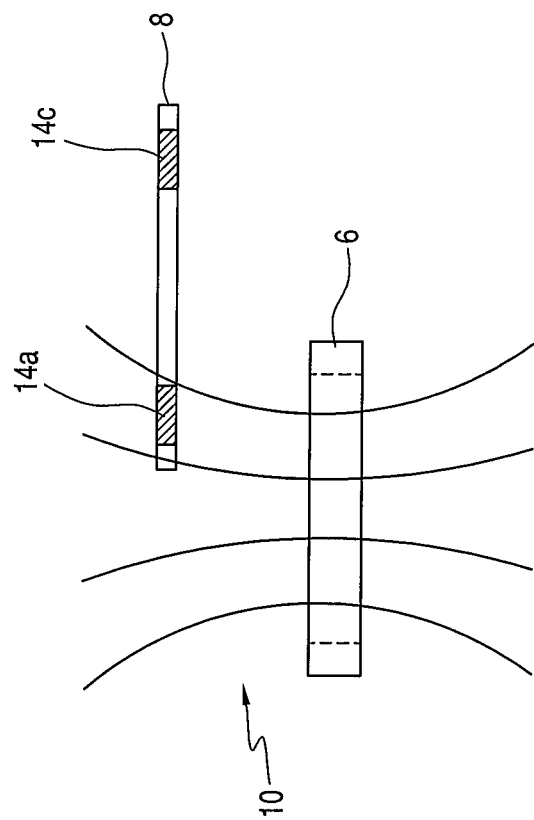
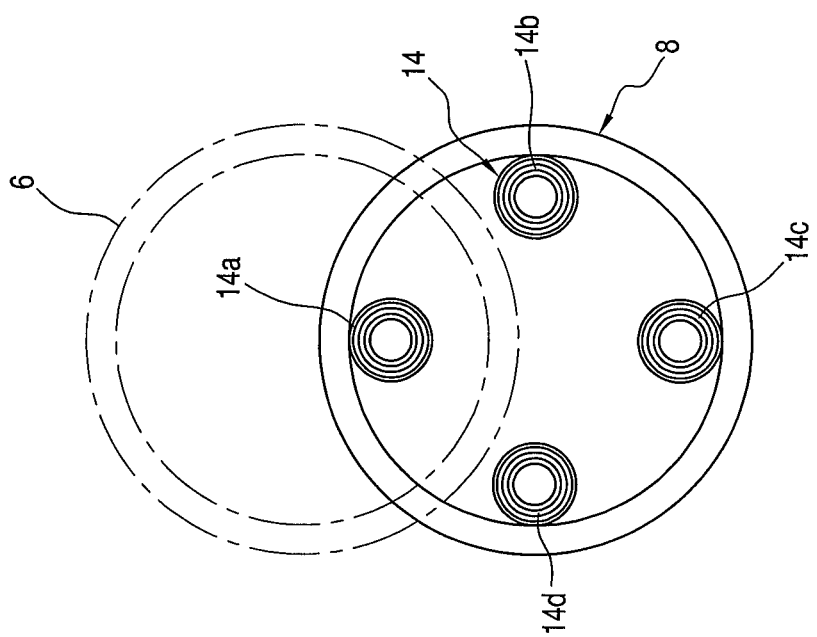
FIG. 3
FIG. 2

METHOD AND APPARATUS FOR ALIGNING A VEHICLE WITH AN INDUCTIVE CHARGING SYSTEM

This application is a continuation-in-part of U.S. application Ser. No. 13/198,863 filed Aug. 5, 2011.

BACKGROUND OF THE INVENTION

Electric vehicle energy storage systems are normally recharged using direct contact conductors between an alternating current (AC) source such as is found in most homes in the form of electrical outlets; nominally 120 or 240 VAC. A well known example of a direct contact conductor is a two or three pronged plug normally found with any electrical device. Manually plugging a two or three pronged plug from a charging device to the electric automobile requires that conductors carrying potentially lethal voltages be handled. In addition, the conductors may be exposed, tampered with, or damaged, or otherwise present hazards to the operator or other naïve subjects in the vicinity of the charging vehicle. Although most household current is about 120 VAC single phase, in order to recharge electric vehicle batteries in a reasonable amount of time (two-four hours), it is anticipated that a connection to a 240 VAC source would be required because of the size and capacity of such batteries. Household current from a 240 VAC source is used in most electric clothes dryers and clothes washing machines. The owner/user of the electric vehicle would then be required to manually interact with the higher voltage three pronged plug and connect it at the beginning of the charging cycle, and disconnect it at the end of the charging cycle. The connection and disconnection of three pronged plugs carrying 240 VAC presents an inconvenient and potentially hazardous method of vehicle interface, particularly in inclement weather.

In order to alleviate the problem of using two or three pronged conductors, inductive charging systems have been developed in order to transfer power to the electric vehicle. Inductive charging, as is known to those of skill in the art, utilizes a transformer having primary and secondary windings to charge the battery of the vehicle. The primary winding is mounted in a stationary charging unit where the vehicle is stored and the secondary winding is mounted on the vehicle To maximize efficiency, it is important that the secondary winding on the vehicle be aligned with the primary winding in the stationary charging unit. The present invention relates to inductive proximity charging. More particularly, the invention relates to a system and for assisting the operator with positioning the vehicle so that the secondary winding thereon is in close proximity and aligned with the stationary primary winding for efficient inductive charging of the vehicle.

BRIEF DESCRIPTION OF THE PRIOR ART

Inductive charging systems are well known in the prior art. For example, the Partovi U.S. patent application publication No. 2009/0096413 discloses an inductive charging system in which includes a base unit containing a primary coil and mobile device including a secondary winding. To assist with alignment of the mobile device and the base unit, a plurality of alignment magnets are provided behind each coil. The magnets behind the primary and secondary coils are arranged in pairs, respectively, with the poles of each pair being opposite so that the magnets will attract and thus align the coils.

While the prior devices operate satisfactorily, they are not suitable for use in vehicle charging systems. First, the magnets add unnecessary weight to the vehicle coil which decreases the efficiency of the vehicle. Second, the magnets are not strong enough to reposition the vehicle or base unit relative to one another.

The present invention was developed in order to overcome these and other drawbacks of the prior alignment techniques by providing an alignment apparatus which assists the operator of a vehicle in positioning the vehicle so that the secondary coil mounted thereon is in close proximity to and aligned with the stationary primary coil in the base unit for maximum inductive energy transfer to a battery charger on the vehicle. The operator of the vehicle is any person or thing that has the ability to control the location of the vehicle. Examples of vehicle operators are human drivers, robots, and computer systems.

SUMMARY OF THE INVENTION

Accordingly, it is a primary object of the invention to provide a method and apparatus for aligning a vehicle with an inductive charging system. The apparatus includes a transformer having a stationary primary coil and a secondary coil mounted on the vehicle. A plurality of alignment coils are spaced in opposing pairs across an axis of symmetry in the vicinity of the secondary coil. When the primary coil is energized, it generates a time harmonic, or alternating current magnetic field which induces voltage in the alignment coils as a function of the proximity of each alignment coil to the central axis of the primary coil. The alignment coils are connected with a controller which generates an output signal corresponding to the position of the vehicle relative to the primary coil. The output signal is utilized to communicate information, via a display or the like, which is used by the operator of the vehicle to position the vehicle so that the secondary coil and primary coils are axially aligned.

The alignment coils each have the same diameter which is significantly less than the diameter of the secondary coil. The alignment coils are arranged symmetrically within the vicinity of the secondary coil and may have axes which are parallel to the axis of the secondary coil. Alternatively, for three-dimensional coils, the orientation of the axis between the alignment coils and the primary and secondary coils is arbitrary.

A voltage sensor is connected with each alignment coil for measuring the voltage induced in each alignment coil by the primary coil. The voltage sensors are connected with a comparator within the controller. The comparator measures the voltage differential between the voltage sensors to generate a directional signal relative to the axis of the secondary coil. The directional signal contains information which is communicated either wirelessly to an external display or directly to a display within the vehicle to provide a visual indication to the vehicle operator of the direction that the vehicle must be moved in order to bring the vehicle secondary coil into alignment with the stationary primary coil.

According to a further object of the invention, the alignment coils can be arranged as an assembly of coils to measure magnetic field components along different spatial axes in order to improve the accuracy in determine the relative proximity to a magnetic field source coil.

It is yet another object of the invention to provide a plurality of alignment coils which are positioned in such a way as to shape a target zone for the primary coil in order to improve the alignment of the secondary coil with respect to the primary coil.

BRIEF DESCRIPTION OF THE FIGURES

Other objects and advantages of the present invention will become apparent from a study of the following specification when read in conjunction with the accompanying drawing, in which:

FIGS. 2 and 3 are top and side views, respectively, of the primary, secondary and alignment coils of the alignment system of FIG. 1;

DETAILED DESCRIPTION

Figure 1:
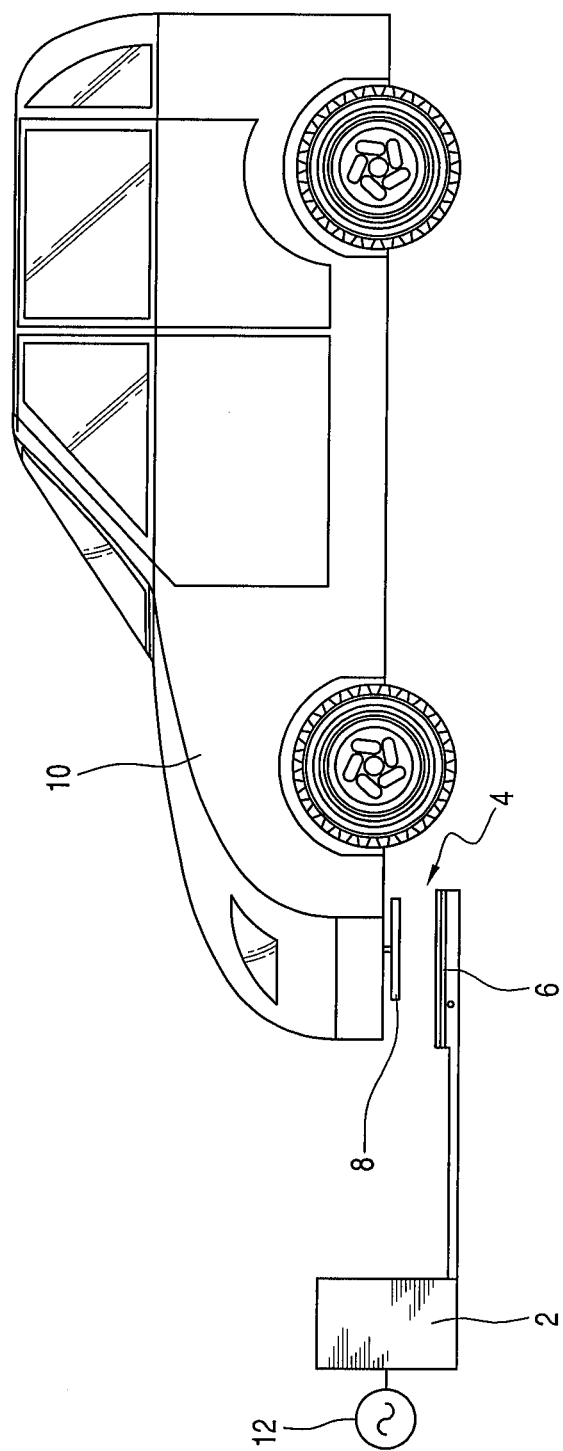
FIG. 1 is a schematic diagram of an inductive vehicle charging system incorporating an alignment system according to the invention.

Referring first to FIG. 1, there is shown an inductive charging system for electric vehicles. The system includes a charging station 2 and a transformer 4. The transformer includes a stationary primary coil 6 which is preferably mounted on the ground such as the floor of a garage. The primary coil is connected with the charging station. The transformer further includes a secondary coil 8 which is mounted on a vehicle 10. The secondary coil is mounted at a location on the vehicle so that the vehicle can be positioned adjacent to the charging station with the secondary coil above the primary coil as shown. Preferably, the coils are arranged with their axes in alignment for maximum energy transfer there between. The charging station 2 is connected with a power source 12.

The system for positioning the vehicle to align the vehicle secondary coil 8 with the stationary primary coil 6 will be described with reference to FIGS. 2-4. Referring first to FIGS. 2 and 3, the primary coil 6 when energized produces a magnetic field 10. The secondary coil 8 includes a plurality of alignment coils 14. In the embodiment shown, four alignment coils 14a-d are provided, although it will be appreciated by those of ordinary skill in the art that greater or less than four alignment coils may be provided as will be developed below.

The alignment coils are symmetrically arranged in the vicinity of the secondary coil. In a preferred embodiment shown in FIG. 2, the alignment coils 14 are spaced in opposing pairs across an axis of symmetry within the inner circumference of the secondary coil 8. The alignment coils are preferably of the same size and configuration and have diameters significantly less than the diameter of the secondary coil. They are preferably arranged adjacent to the inner circumference of the secondary coil and may have axes which are parallel to the axis of the secondary coil as shown in FIG. 3. When the primary coil is energized by the charging station 2, voltages are induced in the alignment coils in accordance with the proximity of the alignment coils to the magnetic field 10. Alternatively, for three-dimensional coils, the orientation of the axis between the alignment coils and the primary and secondary coils is arbitrary. For a one-dimensional coil, the alignment of the axes of the alignment coils is more complicated than just being arranged parallel to the axis of the secondary coil. The opposing pairs of alignment coils are preferably arranged to capture an equal amount of flux from the primary coil when the primary and secondary coils are properly aligned.

In an alternate embodiment, the alignment coils may be arranged externally of the secondary coil. In either embodiment, the alignment coils are spaced from each other in opposing pairs in a symmetrical arrangement relative to the secondary coil as will be developed in greater detail below.

Figure 4:
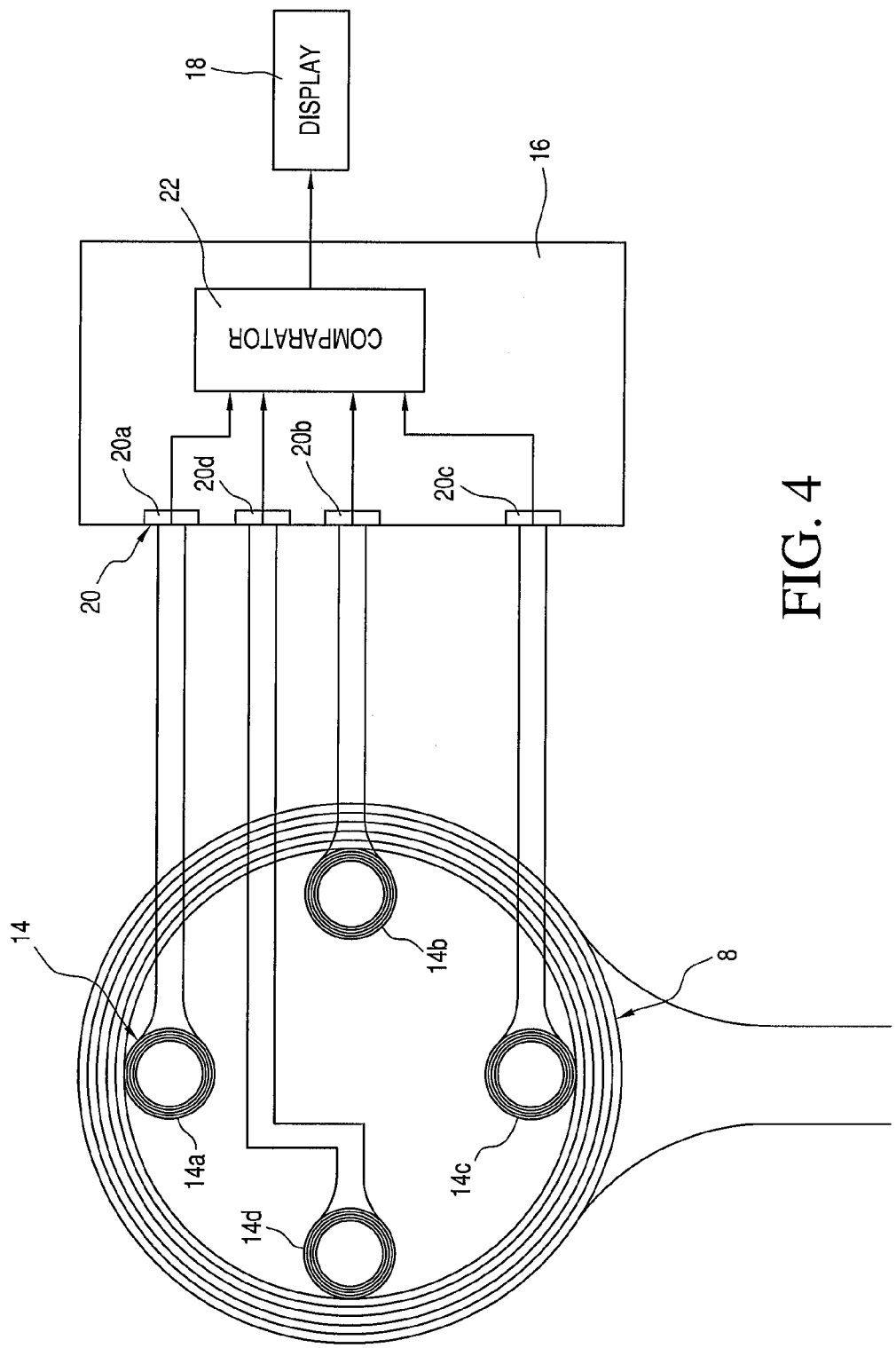
FIG. 4 is a schematic diagram of the secondary and alignment coils and controller of the alignment system of FIG. 1.

Referring now to FIG. 4, the alignment system according to the invention further includes a controller 16 connected with the secondary coil 8. As will be developed below, the controller generates an output directional signal corresponding to the position of the vehicle secondary coil relative to the primary coil. A display 18 is connected with the controller to provide a visual indication of the output signal which is used by the operator of the vehicle to position the vehicle and axially align the secondary coil with the primary coil for maximum induction energy transfer to the secondary coil to power a battery charger (not shown) on the vehicle. The controller 16 includes plurality of voltage sensors 20 connected with the alignment coils 14. Thus in the embodiment shown, voltage sensors 20a-d are connected with alignment coils 14a-d, respectively. The voltage sensors measure the voltage induced in each coil by the primary coil. The controller also includes a comparator 22 connected with the voltage sensors 20. The comparator measures the voltage differential between the voltage sensors to generate the directional signal.

Preferably, an even number of alignment coils are provided, with the coils on opposite sides of the secondary coil being paired. Thus, in the embodiment shown in FIGS. 2-4, coils 14a and 14c are paired and coils 14b and 14d are paired. Referring to FIG. 3, the voltage induced in coil 14a is greater than the voltage induced in coil 14c because coil 14a is closer to the magnetic field. The comparator 22 measures the voltage differential between the opposed pairs of coils and generates a directional signal for each of the opposed pairs. The directional signals from the opposed pairs of coils are combined by the comparator to generate a composite directional signal which is displayed on the display 18 and used by the operator of the vehicle to position the vehicle secondary coil proximate to the primary coil.

As noted above, the charging station 2 is connected with a power source 12. The power source is preferably a 220 volt AC supply operating at between 50 and 60 Hz. For operation of the alignment system according to the invention, the primary coil 6 is initially energized by the power source and charging station at a reduced voltage so that the magnetic field 10 is produced which is symmetric about the axis of the primary coil. The alignment coils are arranged in the secondary coil so that the magnetic flux produced by the stationary primary coil 6 induces a voltage in each alignment coil which is proportional to its proximity to the center of the primary coil. The voltage sensors 20 measure the relative amount of voltage induced in each alignment coil, and the comparator determines the direction of misalignment based on the voltage differential in the opposed pairs of coils. For example, if the vehicle mounted secondary coil 8 is positioned relative to the stationary primary coil 6 as shown in FIGS. 2 and 3, the voltage induced in alignment coil 14a will be larger than in coil 14c. This information can be used to indicate that the vehicle needs to be moved in the direction of coil 14a in order to improve the alignment. When the voltage in all four alignment coils 14a-d is equal, the vehicle secondary coil 8 will precisely aligned with the stationary primary coil. Once aligned, the power supplied by the power source to the primary coil is increased to begin the charging process. More particularly, the charging station includes a power converter which converts the incoming source voltage from the power supply into a sinusoidal voltage of arbitrary frequency and voltage. The sinusoidal voltage is supplied to the stationary primary coil 6. Current within the primary coil generates a magnetic field which induces a current in the secondary coil 8 mounted on the vehicle. This in turn produces an output voltage which is delivered to a battery charger (not shown) in the vehicle to charge the vehicle battery.

It will be appreciated that the alignment system according to the invention may be provided with only a single pair of opposed alignment coils if only two-direction misalignment information is desired. Additional pairs of alignment coils may be provided for more precise alignment information.

The inductive charging system may complement a conventional conductive charger. The controller 16 is operable to control both types of charging as well as operation of the alignment system. A transfer switch (not shown) on the controller is operable to isolate the charging sources to prevent the user from simultaneously using both inductive and conduction recharging systems.

Figure 5:
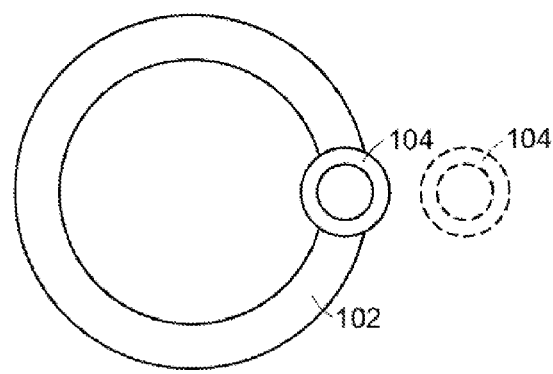
FIGS. 5 and 6 are top and side views, respectively, of source and detector coils of a proximity detector.
Figure 6:
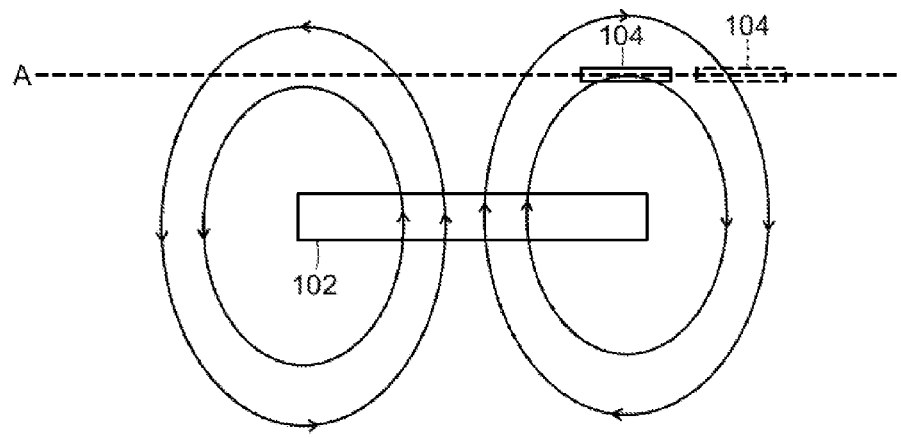
Figure 7:
FIG. 7 is graph showing the induced voltage along a plane of the detector coils shown in FIGS. 5 and 6.

FIGS. 5 and 6 illustrate a magnetic field source coil 102 and a detector coil 104 of a promity detection system. The detector coil 104 is shown in two positions, one in phatom, relative to the coil 102. As shown therein, the measurement or detector coil is located in close proximity to the source coil which is creating the magnetic field. In this case, the axis of the detector coil is significantly different than the direction of the magnetic flux, and the voltage induced in the detector coil accurately reflects the magnitude of the magnetic flux through the coils. However, the flux lines from the primary coil do not have a uniform direction throughout the plane within which the alignment coil moves. Accordingly, the alignment coil at the two different locations within this plane shown in FIGS. 5 and 6 each capture flux lines at a different angle leading to an induced voltage that does not necessarily increase as the alignment coils are moved closer to the primary coil. In fact, with single axis alignment coils as shown, there will always be a dead zone where the induced voltage falls off and then rises back up as the coils become tangent to the field lines. For a single axis coil that is parallel to the primary or charging coil, this occurs when the detector coil 104 is placed directly above the edge of the primary coil. The induced voltage for the detector coil in the positions shown in FIGS. 5 and 6 is shown in FIG. 7.

Figure 8:
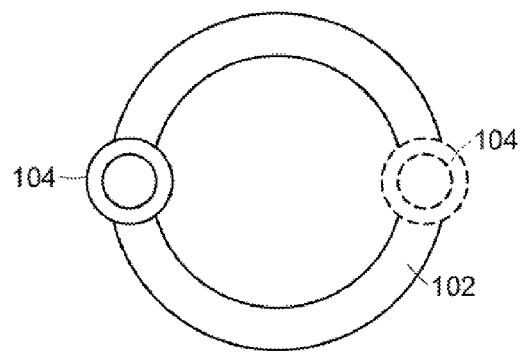
FIGS. 8 and 9 are top and side views, respectively, of source and detector coils of a proximity detector with the detector coils in different positions than those shown in FIGS. 5 and 6.
Figure 9:
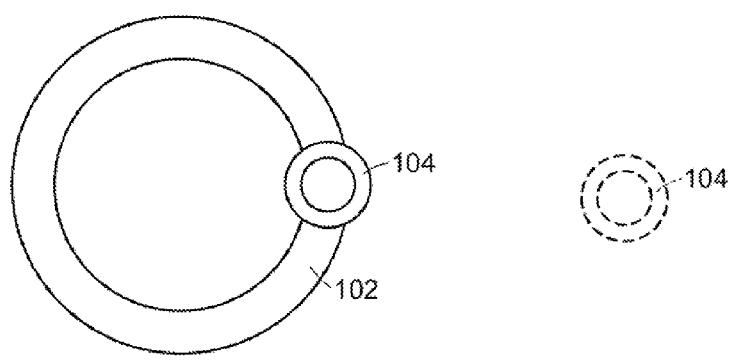
Figure 10:
FIG. 10 is a graph showing the induced voltage along a plane of the detector coils shown in FIGS. 8 and 9.

FIGS. 8 and 9 show additional positions of the detector coil which cannot be distinguished by the sensors. The induced voltage for the detector coil in the positions shown in FIGS. 8 and 9 is shown in FIG. 10.

Figure 11:
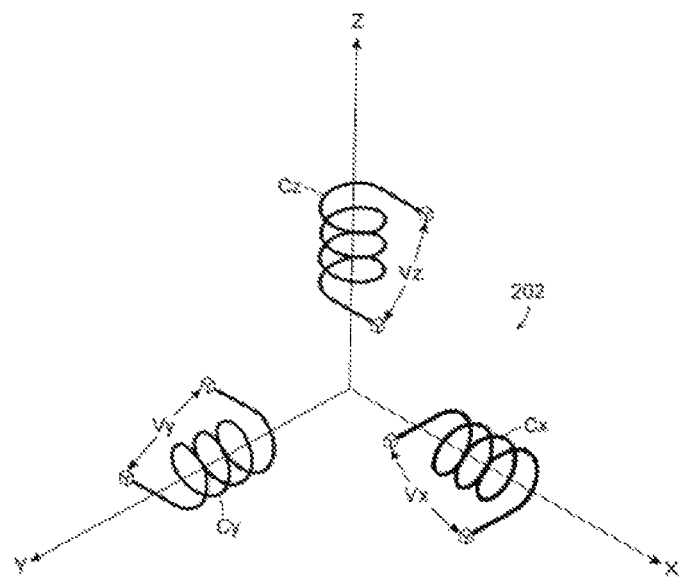
FIG. 11 a perspective view of a multi-axis coil assembly according to another embodiment of the invention.
Figure 11A:
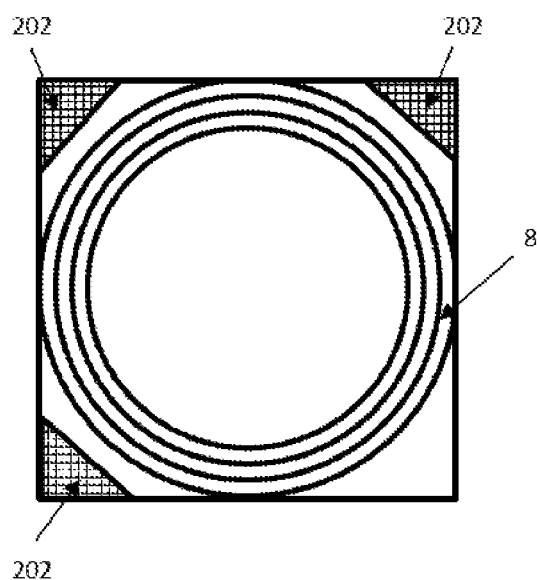
FIG. 11A is a schematic diagram of a plurality of alignment coil assemblies spaced in the vicinity of a secondary coil.
Figure 12:
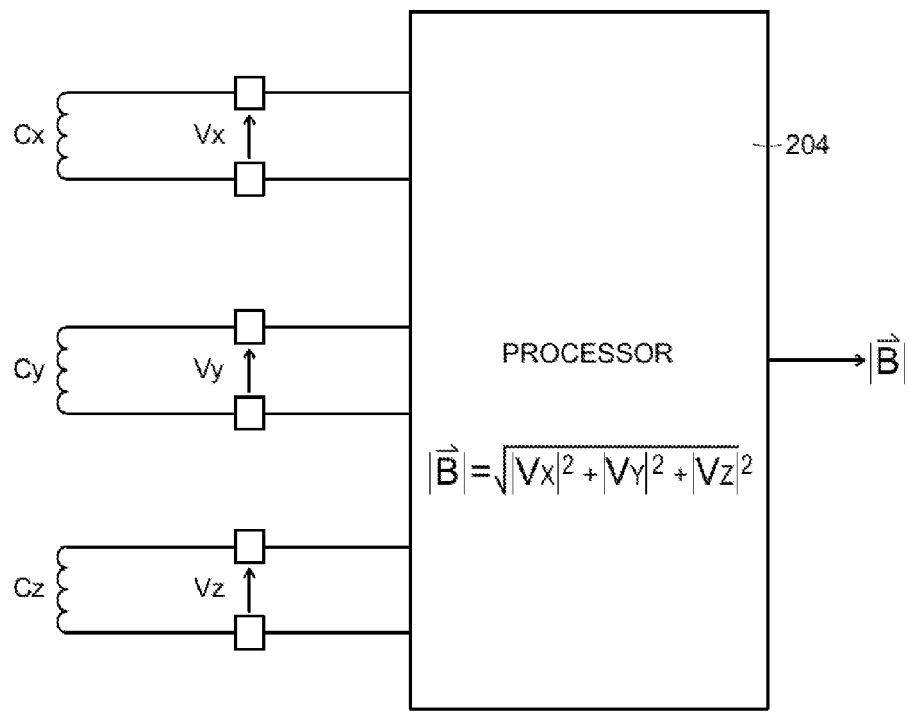
FIG. 12 is a schematic diagram of circuitry used to calculate the magnetic flux magnitude of the multi-axis coil assembly of FIG. 11.

According to another embodiment of the invention, a multi-coil assembly is used in place of single coils to produce more accurate proximity measurements based on magnetic flux measurement. The preferred embodiment of a multi-coil assembly is shown in FIG. 11 where the multi-coil assembly 202 includes three coils $C_x$, $C_y$, and $C_z$, with each coil being oriented orthogonally to the plane defined by the axis of the other two coils. When in the presence or vicinity of a time varying magnetic field, the voltages $V_x$, $V_y$, and $V_z$ induced in each coil will be proportional to the magnitude of the spatial component of the magnetic field in the direction of each coil axis. Because the magnetic flux density magnitude $|B_t|$ can be expressed as a function of the x, y, and z spatial components $B_x$, $B_y$, and $B_z$ as $$|B_t|=\sqrt{(|B_x|^2+|B_y|^2+|B_z|^2)} \qquad \text{equation 1}$$

a value proportional to $|B_t|$ can be calculated based on the measured coil voltages $V_x$, $V_y$, and $V_z$, so that $|B_t|$ is proportional to $\sqrt{(|V_x|^2+|V_y|^2+|V_z|^2)}$. This calculation can be implemented using external circuitry and any of a variety of well understood techniques which may be analog or digital. An example of a circuit for calculating the magnetic flux density magnitude $|B_t|$ for the coils $C_x$, $C_y$, and $C_z$ is shown in FIG. 12 using a processor 204 connected with the coils for processing the voltages of each.

Figure 13:
FIG. 13 is a graph showing the induced voltage using a multi-axis sensor in the positions shown in FIGS. 8 and 9.
Figure 14:
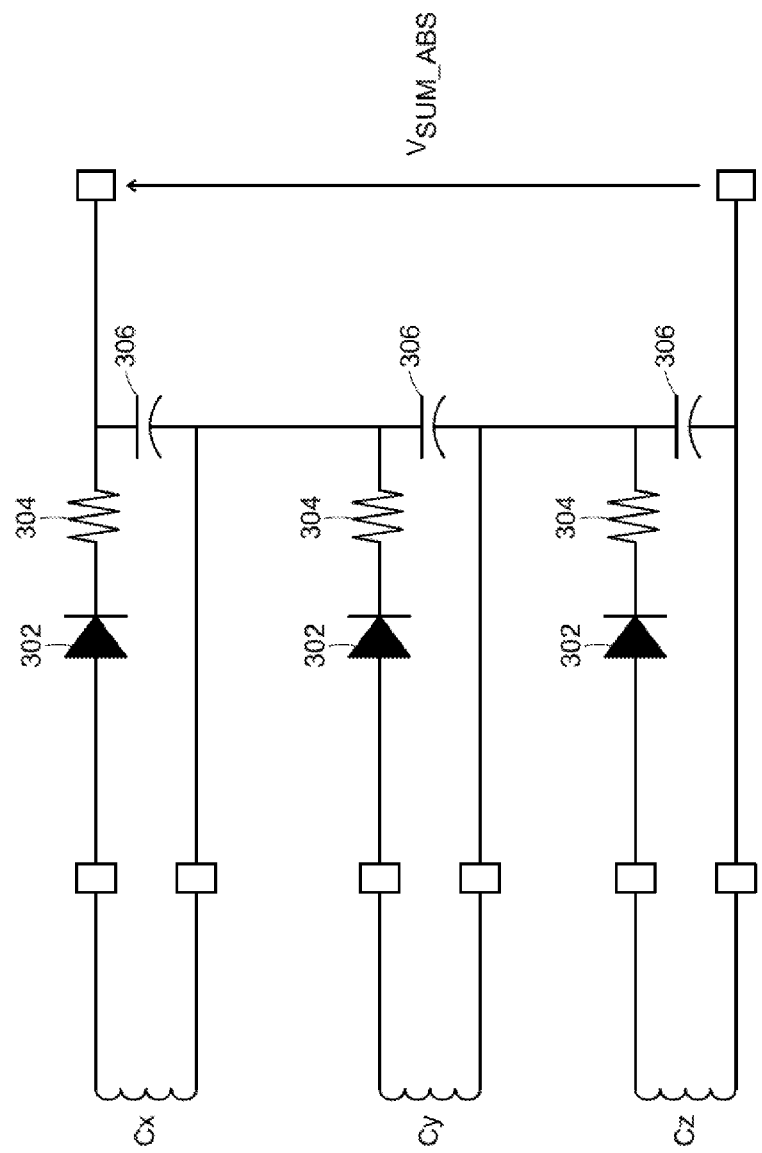
FIG. 14 is a schematice diagram of alternate circuitry used to approximate the magnetic field magnitude of the multi-axis coil assembly of FIG. 11.

However, for the purpose of determining the relative location of two alignment coil assemblies, this calculation can be simplified. For example, the quantity $V_{sum\_abs}$, defined by the equation $$V_{sum\_abs}=(|V_x|V_y|V_z|) \qquad \text{equation 2}$$

can be used to determine the relative position of the coil assemblies with respect to a primary coil which is creating the magnetic field. This calculation requires less complex external circuitry to process the coil voltage measurements. For example, the external circuitry may include simple passive components such as a diode rectifier and low pass filter applied to each coil. In FIG. 13, the individual rectified coil outputs are connected in series in order to approximate the magnetic field magnitude. The coils are connected in series with diodes 302 and resistors 304 and in parallel with capacitors 306. The voltage $V_{sum\_abs}$ is provided at the output of the circuit of FIG. 14.

The voltage induced in a multi-axis sensor in the positions shown in FIGS. 8 and 9 is represented by the plot shown in FIG. 13.

Figure 15:
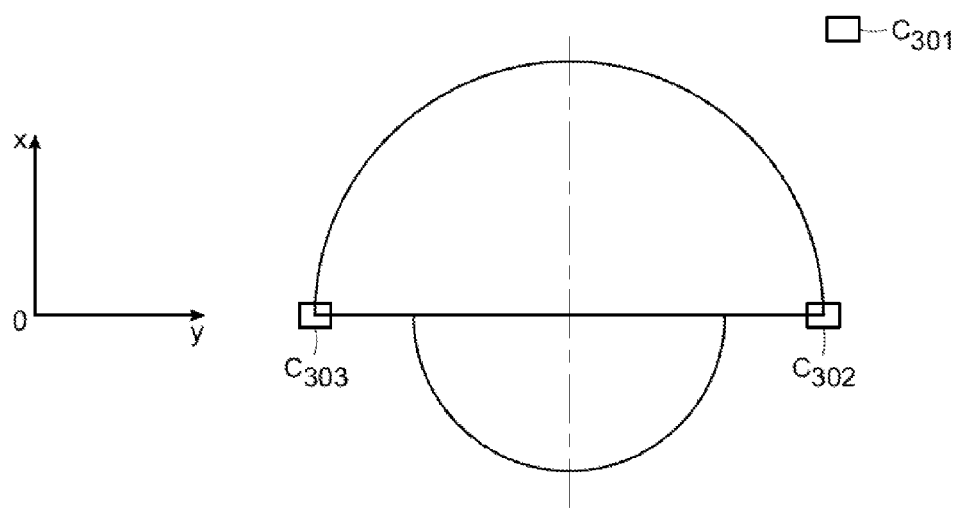
FIG. 15 is a schematic representation of a target zone for a proximity detection system using three coils.
Figure 16:
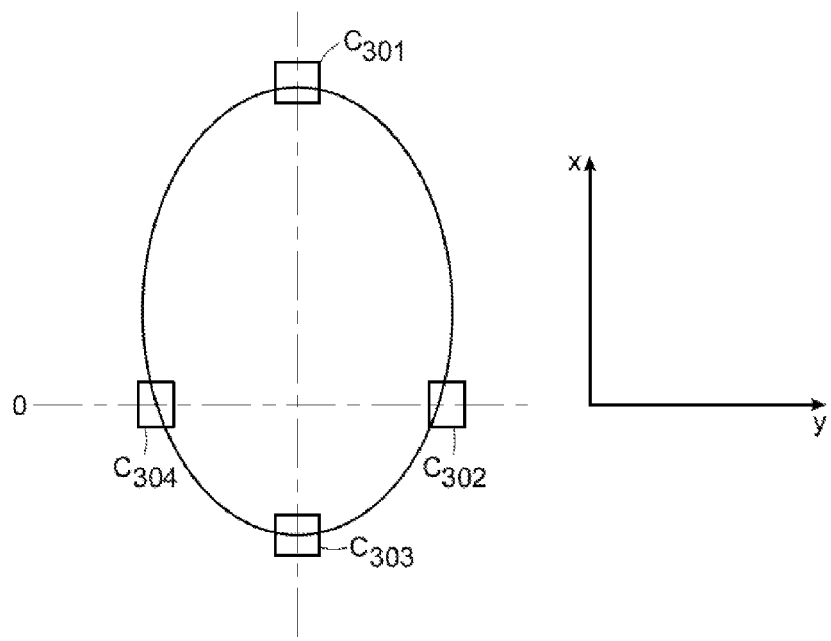
FIG. 16 is a schematic representation of a target zone for a proximity detection system using four coils.

The emission of electromagnetic fields (EMF) is a major concern of standards and regulatory bodies. Because EMF drops off rapidly with distance, one way to reduce exposure is to ensure that the primary coil is positioned well underneath the vehicle. By using multiple detector coils, the shape of the target zone can be biased so that the primary coil is always positioned relative to the secondary coil in such a way that the stray EMF emitted from underneath the vehicle is below allowable standards or regulations. This is done by changing the acceptable threshold for $V_x$ and $V_y$. Thus, the size and shape of the target zone can be modified. FIGS. 15 and 16 show varied target zones. In FIG. 15, the shape of the zone is defined as two conjoined semicircles. Optimal alignment occurs within the range of the larger semicircle shown in FIG. 15. In the event that the driver of a vehicle to be charged overshoots the stationary primary coil when parking the vehicle, the alignment zone is greatly reduced as shown by the lower semicircle in FIG. 15 to ensure that EMF levels emitted from the vehicle remain within specified guidelines.

In FIG. 16, a fourth detector coil $C_{304}$ is added and the coils are positioned on the desired axes. This arrangement allows for better resolution of the center point of the target zone and the overall zone takes on an arbitrary shape. The exact size and shape of the zone is determined primarily by the allowable thresholds set in the processing circuit. The arbitrary shape for the alignment zone is preferred since it does not create a discontinuity at any point in the alignment zone such as the one that occurs between the top and bottom semicircles shown in FIG. 15. The size and shape of the alignment zone can be changed and refined through control of the analysis of data and feedback to the user. Additional detector coils improve the accuracy of positioning the vehicle relative to the primary coil. A fixed controller algorithm can be used to control the shape of the alignment zone to some extent with the position of the detector coils. For example, if the controller only seeks to have the detector coils all be equal, then detector coils can be positioned around the desired center point of alignment even if that is not the center point of the secondary coil. Alternatively, the controller can seek the desired difference in the values from the detector coils instead of trying to make them equal in order to achieve the same effect.

Figure 17:
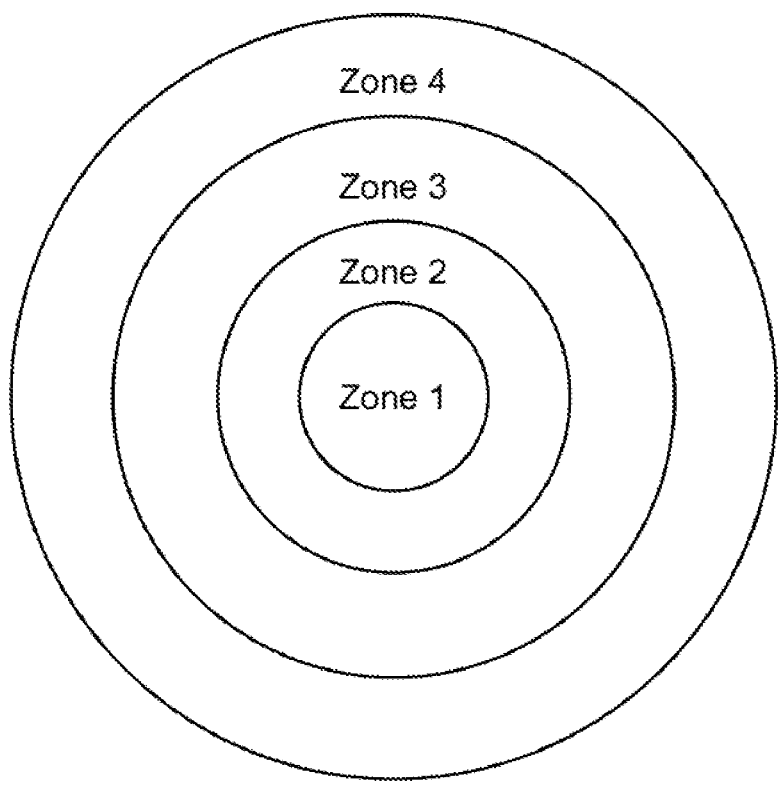
FIG. 17 is a diagram showing the preferred embodiment of alignment zones.
Figure 18:
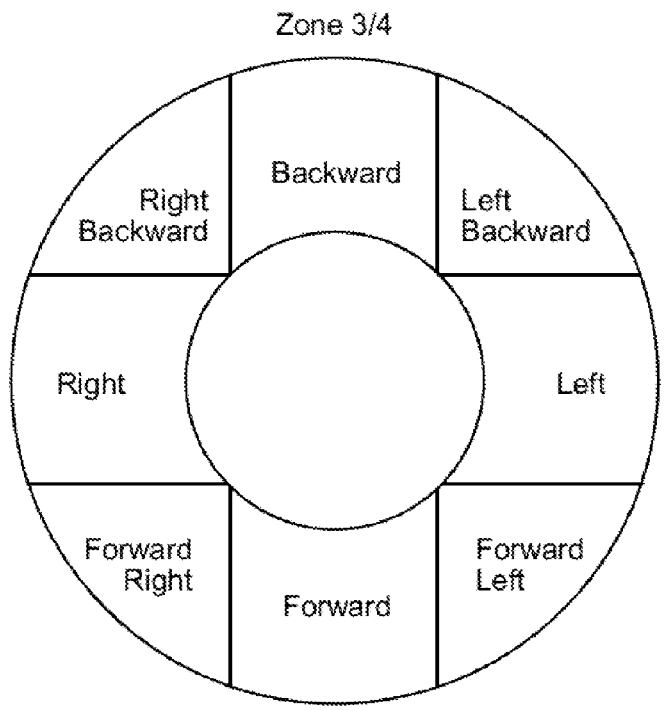
FIG. 18 is a diagram showing the preferred embodiment of sub-alignment zones.
Figure 19:
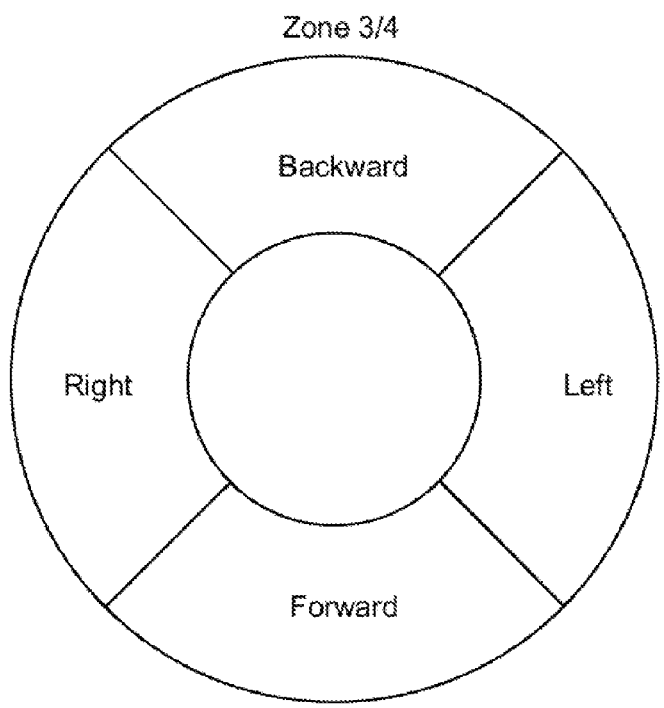
FIG. 19 is a diagram showing an alternate configuration of sub-alignment zones.

The alignment zones can be used to control field levels outside the perimeter of the vehicle, but they have other uses. The alignment system utilizes multiple zones as shown in FIGS. 17-19. Zone 1 is the zone in which the system will indicate to the user to stop. The second, slightly larger Zone 2 is the area where the system will continue to indicate to stop. Zone 3 is an even larger zone which is used to define the area in which the charger is capable of operating. Zone 4 is beyond Zone 3 and provides an area where guidance to move the vehicle is provided, but the charger is not capable of operating. In operation, the alignment system indicates to the vehicle operator to move forward, back, left, or right until the vehicle enters the first zone, at which point it indicates to stop. The alignment system continues to indicate to stop as long as the vehicle is in the second zone. If the vehicle exits the second zone then the system again indicates to the vehicle operator to move forward, back, left, or right until the vehicle enters the first zone, at which point it indicates to stop. When the vehicle is turned off, the alignment system verifies that it is still within the third zone before beginning charging.

The first and second zones provide a form of hysteresis around the response time of the driver to the feedback from the system. This is especially important when the driver just grazes the edge of first zone and is only in this area for a fraction of an inch. The second and third zones are needed because of the amount that the vehicle can roll or rock after being turned off. This is particularly a problem if the parking brake is not set. By forcing the driver to align slightly closer than needed to charge, car shifting after the car has been parked and the driver has exited the vehicle can still be accommodated.

Various types of feedback to the user during positioning of the vehicle may be used. By way of example only, a display of scrolling arrows that slow down as the vehicle gets closer to the primary coil may be provided. The speed of the arrows is proportional to distance from the vehicle to the primary coil. When the vehicle needs to be moved left, right, or backwards, these indicators are illuminated and flash at a fixed rate. Once the user is in position, a green ring is illuminated to indicate that the user should stop.

While the preferred forms and embodiments of the present invention have been illustrated and described, it will be readily apparent to those skilled in the art that various changes and modifications may be made without deviating from the inventive concepts set forth above.

What is claimed is:

1. Apparatus for aligning a vehicle with an inductive charging system, comprising:
   (a) a transformer including a stationary primary coil and a secondary coil mounted on the vehicle;
   (b) at least one alignment coil assembly including at least three assembly coils, each assembly coil having a longitudinal axis and oriented orthogonally to a plane defined by the longitudinal axes of two other assembly coils, said alignment coil assembly being arranged in the vicinity of said secondary coil, said primary coil generating a magnetic field when energized to induce a voltage in each assembly coil; and
   (c) a controller connected with said alignment coil assembly for generating an output signal corresponding to the voltage induced in each assembly coil by the magnetic field, each voltage corresponding to the position of the secondary coil relative to the primary coil.

2. Apparatus as defined in claim 1, wherein said controller includes a processor for processing the induced voltages from said assembly coils to produce said output signal which corresponds to the magnetic field through each assembly.

3. Apparatus as defined in claim 1, wherein said controller includes a diode rectifier and low pass filter connected with each assembly coil for measuring the voltage induced therein by the magnetic field.

4. Apparatus as defined in claim 3, wherein said diode rectifier and low pass filter for each assembly coil are connected in series to produce an output which corresponds to the magnetic field amplitude.

5. Apparatus as defined in claim 1, wherein a plurality of alignment coil assemblies are provided, said assemblies being equally spaced in the vicinity of said secondary coil.

6. A method for aligning a vehicle with an inductive charging system including a stationary primary coil and a secondary coil mounted on the vehicle, comprising the steps of
   (a) providing at least three assembly coils, each assembly coil having a longitudinal axis and oriented orthogonally to a plane defined by the longitudinal axes of two other assembly coils;
   (b) energizing the primary coil to generate a magnetic field which induces a voltage in each alignment coil; and
   (c) generating an output signal corresponding to the voltages induced in each assembly coil, each voltage corresponding to the position of the secondary coil relative to the primary coil.

7. A method as defined in claim 6, wherein said output signal corresponds to the magnetic field amplitude.

* * * * *